(12) United States Patent
Reeves et al.

(10) Patent No.: US 9,538,449 B1
(45) Date of Patent: Jan. 3, 2017

(54) QUALITY OF SERVICE OPTIMIZER FOR MOBILE DEVICE

(71) Applicant: Sprint Communications Company L.P., Overland Park, KS (US)

(72) Inventors: Raymond Emilio Reeves, Oviedo, FL (US); Ryan Alan Wick, Apollo Beach, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/790,844

(22) Filed: Jul. 2, 2015

Related U.S. Application Data

(60) Division of application No. 14/038,313, filed on Sep. 26, 2013, now Pat. No. 9,106,562, and a continuation of application No. 12/788,043, filed on May 26, 2010, now Pat. No. 8,547,834.

(51) Int. Cl.
| | | |
|---|---|---|
| *H04L 12/26* | (2006.01) | |
| *H04W 40/12* | (2009.01) | |
| *H04L 29/08* | (2006.01) | |
| *H04W 24/08* | (2009.01) | |
| *H04L 12/24* | (2006.01) | |

(52) U.S. Cl.
CPC .......... *H04W 40/12* (2013.01); *H04L 41/0836* (2013.01); *H04L 67/1095* (2013.01); *H04L 67/2842* (2013.01); *H04W 24/08* (2013.01)

(58) Field of Classification Search
CPC ... H04W 40/12; H04W 24/08; H04L 67/1095; H04L 67/2842; H04L 41/0836
USPC .......................................................... 370/229
See application file for complete search history.

(56) References Cited

U.S. PATENT DOCUMENTS

| | | | | |
|---|---|---|---|---|
| 5,864,837 A | * | 1/1999 | Maimone | ............ G06F 12/0815 |
| 2005/0138654 A1 | * | 6/2005 | Minne | ................ H04N 7/1675 |
| | | | | 725/31 |
| 2005/0255856 A1 | * | 11/2005 | Griffin | ............. H04W 36/0083 |
| | | | | 455/456.1 |

* cited by examiner

*Primary Examiner* — Sai-Ming Chan

(57) ABSTRACT

A method, system, and medium are provided for improving communication between a mobile device and a wireless network in embodiment of the invention. Based in part on expected locations for a mobile device and network availability, predictions can be made regarding the future quality of service available for the mobile device. This prediction can allow actions to be taken to mitigate any change in the quality of service.

22 Claims, 6 Drawing Sheets

| Remote Cache Monitoring 310 | Device Tracking 320 |
|---|---|
| Network Availability Monitoring 330 | Activity Prediction 340 |
| Content Acquisition 350 | Quality of Service Prediction 360 |
| Qualtiy of Service Mitigation 370 | Content Sorting 380 |

*FIG. 3*

QUALITY OF SERVICE OPTIMIZER FOR MOBILE DEVICE

CROSS REFERENCE TO RELATED APPLICATIONS

This application is a divisional of, and claims priority from, U.S. patent application Ser. No. 14/038,313, filed Sep. 26, 2013, entitled "QUALITY OF SERVICE OPTIMIZER FOR MOBILE DEVICE," which is a continuation of, and claims priority from, U.S. patent application Ser. No. 12/788,043, filed May 26, 2010, entitled "QUALITY OF SERVICE OPTIMIZER FOR MOBILE DEVICE," both of which are incorporated herein by reference in their entirety.

BACKGROUND

One of the ongoing challenges for a wireless service provider is to maintain a high quality of service for customers of a wireless network. Due in part to increasing computer power, even delays on the order of seconds may be perceived by customers as a sign of "slow" operation. Such customer perceptions can influence the ability of a service provider to retain customers.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief, and at a high level, systems, methods, and computer-readable media with executable instructions are provided for improving communication between a mobile device and a wireless network in embodiment of the invention. Based in part on expected locations for a mobile device and network availability, predictions can be made regarding the future quality of service available for the mobile device. This prediction can allow actions to be taken to mitigate any change in the quality of service.

BRIEF DESCRIPTION OF THE SEVERAL VIEWS OF THE DRAWINGS

Illustrative embodiments of the present invention are described in detail below with reference to the attached drawing figures, and wherein:

FIG. 3 schematically shows components for a system suitable for performing an embodiment of the invention.

DETAILED DESCRIPTION

Figure 1:
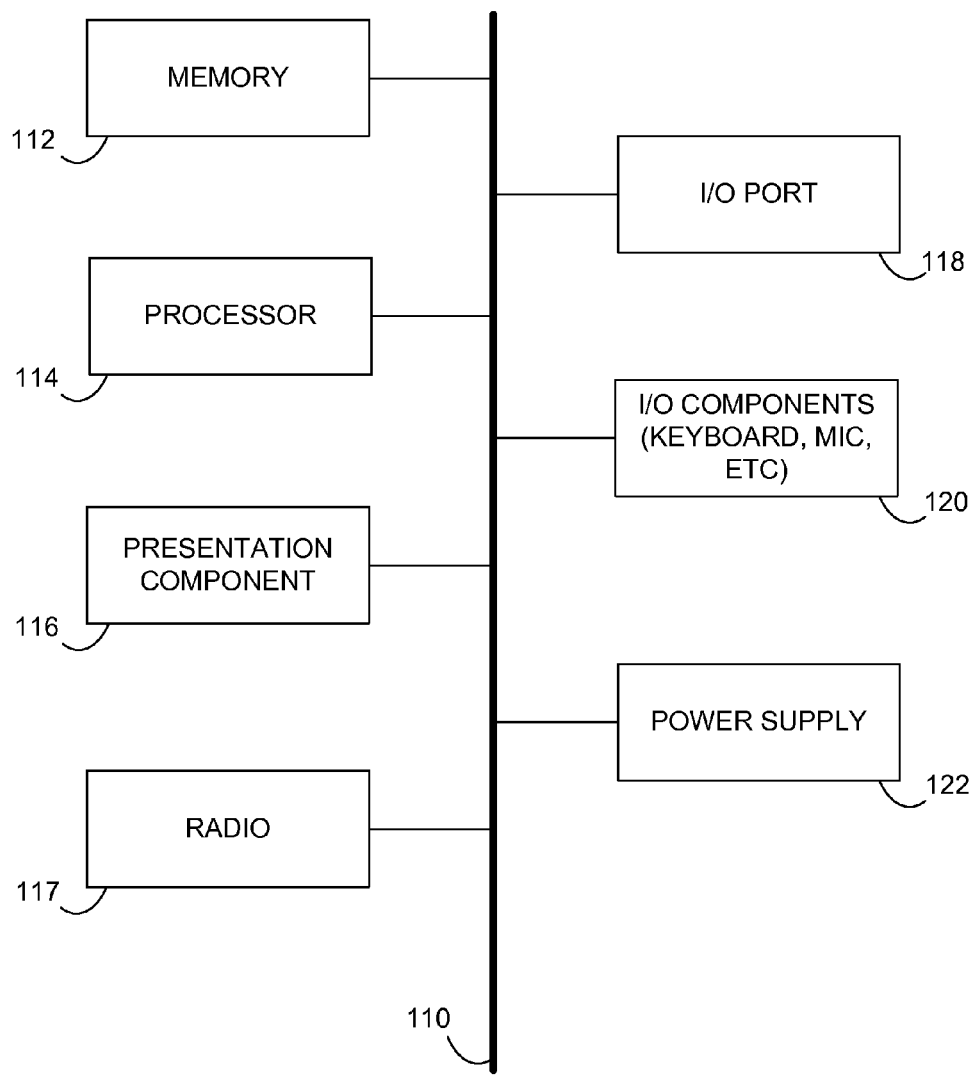
FIG. 1 schematically depicts a general mobile device or other computing device in accordance with an embodiment of the invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Various technical terms are used throughout this description. An illustrative resource that fleshes out various aspects of these terms can be found in Newton's Telecom Dictionary by H. Newton, 24th Edition (2008).

Overview

In various embodiments, systems, methods, and/or computer readable media are provided that can allow for improved quality of service for mobile devices. The improved quality of service can be provided based on analysis of both individual wireless use and aggregate wireless use. This analysis allows provision of wireless services to be adapted based on not only the current network availability for a device, but also based on a predicted network capability.

In an embodiment, one type of information that can be analyzed is information regarding an individual mobile device or user. The information analyzed for an individual device or user can include the services being accessed by a device. Based on the current services being used, and optionally the recent or longer term usage history, predictions can be made about the next content items or services that a user is likely to access. Another type of information that can be analyzed is information related to movement of a mobile user or device. The recent locations of a device can be used to develop a trajectory for the device. This can allow for prediction of where the device will be in the near future.

Analysis can also be performed on data aggregated from multiple users, such as all users of a network. The aggregate information that is analyzed can include usage histories over a group of users. This type of analysis can be used to improve the prediction of what a typical user is likely to access in the future based on current usage. Aggregated information can also be gathered regarding the wireless availability and/or data access speeds at various locations in a network. For example, a typical network may have a listed capacity and/or speed at various locations in a network based on the available infrastructure. However, local variations in a network, such as variations in data download speed due to high usage, may not be known ahead of time. Data can be aggregated from a plurality of mobile devices within a network regarding the actual data speeds at various locations. This information can be aggregated to provide a dynamically updated coverage map of wireless availability.

Based on the individual and/or aggregate data, decisions can then be made regarding ways to improve quality of service for a user. For example, if a user is currently in an area with a high quality of wireless service, but is moving toward an area with no service or a low rate of data transfer, content items that are likely to be requested by a user can be transferred ahead of time and stored in a data cache. Alternatively, if a user is in an area with a lower data transfer rate, actions can be taken to reduce the amount of requested data, such as degradation of the data or waiting until data expiration before requesting refreshes. Still another option can be to warn a user that is about to enter a low transfer rate area that service may be temporarily unavailable.

Semi-Static Application Specific Data

One type of data that can be transferred to and from a mobile device is semi-static application specific data. In some embodiments, controlling requests for this type of data can lead to improved quality of service.

A mobile device can access a wireless network to download a variety of types of information. Some types of information must, by definition, be downloaded as they are requested. For example, a ticker of streaming real-time stock information corresponds to a continuous stream of information that cannot be accessed ahead of time. Instead, the information must be accessed as it becomes available. Similarly, for a conference or other live presentation that is being viewed as it occurs, such as a webcam of an event, the video feed can only be accessed as it becomes available. Such a live feed cannot be considered semi-static, as the content of the feed cannot be determined ahead of time. This situation can be contrasted with playback of a music album or video recording, or a broadcast of an event that is being shown on a delayed basis.

Another type of data that can be accessed by a mobile device is data involving specialized calculations. For example, a user may access a website of a financial company that includes a retirement savings calculator. A user can enter financial and retirement age information into the calculator, and the calculator will then return values regarding the amount of savings the user can or should accumulate. The retirement calculator features cannot be accessed until a user submits the appropriate information. As a result, the retirement calculator feature does not correspond to semi-static data.

A mobile device including a Global Positioning System can potentially provide an example of both semi-static application specific data and data that is not semi-static. It cannot be predicted ahead of time when a user will request a new route, or what the new destination will be. Thus, the calculation of a new route is not semi-static data. However, once a route has been calculated, tracking of a user's progress along a route can be a semi-static process. The external input for tracking a user's progress is dependent on GPS data, not data accessed via a mobile network. Additionally, the map portions a user is going to approach in the near future, such as the next 10 minutes or next 10 miles, can be determined from the already calculated route. Thus, all of the information needed from a wireless network (the map segments) to continue tracking a user's progress along the route can be downloaded ahead of time. The map segments correspond to semi-static application specific data.

Other examples of semi-static application specific data can correspond to streams of data that are known ahead of time. For example, a mobile device user can decide to view a movie. Although the entire content of the movie is known ahead of time, the mobile device may only request portions of the movie at one time. An internet radio station with a predetermined play list could be another example.

Typical web page content can also correspond to semi-static data. For example, a text article or video clip located on a web page may change rarely over time. Even at a news website, many of the content items can have an expiration time of at least about 10 minutes, or at least about 15 minutes, or at least about 1 hour. A user who has previously accessed an item from a webpage that is still in the cache for the mobile device may not need to refresh the item in order to view the most current version.

Predicting Changes in Quality of Service

In an embodiment, a change in quality of service can occur for a variety of reasons. One reason can be that a mobile device is about to move from an area of coverage within a wireless network to an area without coverage. In this situation, the potential loss of service can be complete. Alternatively, the mobile device can be about to move out of the coverage area of a primary provider, but still be within the coverage area of one or more other providers. In this situation, the change in quality of service can vary. Some features that a primary provider offers may be unavailable in the networks provided by the other providers. The other networks may have lower data speeds and/or may provide limited bandwidth to mobile devices that do not normally use a given network. Use of a network other than the network of a primary provider can also lead to increased costs for the user and/or the primary provider. Thus, it can be beneficial to anticipate situations where a mobile device will attempt to access data from outside the network of the primary provider.

Another situation that can lead to a change in quality of service is when the network of the primary provider is performing at less than expected efficiency. This can occur for a variety of reasons. External conditions or an equipment malfunction may reduce the typically expected bandwidth for data delivery in a given area. Alternatively, high volumes of data requests in a localized area may exceed network capacity, resulting in a reduction in speed for some or all mobile devices within the localized area. Still another possibility is that a portion of a network may be undergoing repair. Yet another option is that a relatively new portion of a network may have lower capability than other portions of the network. Thus, it can be beneficial to anticipate situations where a mobile device will attempt to access data from inside the network, but in an area where network capabilities are lower than typical.

Occasionally, identifying a potential change in quality of service issue will involve identifying a change for a mobile device that is in a fixed location. For example, a network upgrade could require a reboot of servers that form part of the network, resulting in a reduction in service for a brief time. Alternatively, network traffic within a locality can increase over time, causing a high quality of service area to transition to an area with a reduced quality of service.

More typically, a change in quality of service for a mobile device will occur because the device is in motion. In this situation, determining that a change in quality of service may occur can involve determining the expected path of the device. This expected path can then be compared with the network characteristics the device would encounter on the expected path.

As an initial condition for calculating an expected path, a method can be available for determining the current location of a device. This can be determined by any convenient method. If the device includes GPS functionality or another position sensing function, this information can be used. Another option can be to determine a position by triangulation based on multiple transmitting stations in a wireless network. Still another option can be to only track location in an approximate manner. For example, the movement of a device from one wireless transmitting station to another can be recorded. Rather than tracking an individual location, this method only tracks changes in the local wireless stations.

This type of tracking can be useful for predicting the movement of mobile devices that are traveling longer distances.

An expected path can be calculated in any convenient manner. A simple way for calculating an expected path can simply involve extrapolating a current direction of travel for a mobile device at a current speed. This extrapolation can be used to identify an expected path for a device for a period of time, such as about 1 minute, or about 5 minutes, or about 10 minutes. Alternatively, an average direction and speed of travel for a device over a period of time can be determined, such as an average direction and speed of travel over the previous about 1 minute, or about 5 minutes, or about 10 minutes. This average direction of travel can then be used to identify an expected path for a period of time as described above. If more detailed location information is available, such as GPS information, another option for determining an expected path can involve comparing recent location data with a map. For example, recent location data may indicate that a mobile device is following the route of an interstate freeway or a railroad line. In this situation, the expected path could correspond to the path of the freeway or railway. For a GPS enabled device, still another option could be to use the planned GPS route that is being tracked by the device as the expected path. In such an embodiment, an average speed could be used, or the speed limits for the roads on the expected path could be used to determine an expected speed.

The expected path for a device can then be compared to a network availability map. The network availability map can potentially include a number of types of information. One type of information can be information about areas of coverage for a network, or the external boundaries of a network. Another type of information can be information about differences in the capabilities of the network, such as differences in the data transfer rate to an individual device. The above types of information will tend to change slowly over time, as they represent structural characteristics of a network. Still another type of information can be information about current network speeds in a location. This could include identifying portions of a network that are performing below expectation, due to equipment failures, excessive requests for network resources, or other reasons. This type of information could include the actual network characteristics (such as data transfer rates) for various portions of the wireless network. The expected path of a mobile device and a network availability map can be used to predict future network availability for the device.

Predicting Activity for a Mobile Device

In addition to determining an expected path for a mobile device, the expected future activity of a mobile device can also be predicted. Future activity can be predicted using any convenient algorithm or method. In an embodiment, the future activity of a mobile device can be predicted based on current activity. For example, if a mobile device is currently downloading a movie, playing an album of songs, displaying a delayed showing of a sporting event, or otherwise accessing a long file or related series of files, an activity prediction can be that the user of the mobile device will continue to access this material.

In other embodiments, predictions of future activity can be based on similarity of a group of content items. For example, a user of a mobile device may be currently accessing an editorial or opinion piece at a news website. The editorial or opinion piece can also be tagged at the news website as relating to international affairs. Based on this, a prediction of future activity can be made that the user will likely want to view all current editorial or opinion pieces, as well as all current international affairs articles. A "current" piece or article can have any convenient definition, such as an article posted to the site within the last 24 hours. Other future activity predictions based on similar data could include predicting that a user viewing a picture will want to view other pictures from a collection, or that a user viewing a product at a merchandising website will want to view other similar products.

Still another method for predicting future activity can be based on detecting patterns in the aggregated activity of many users. Activity for a large number of users can be aggregated to determine patterns or correlations in content items that are accessed. These correlations can then be used to predict future activity for individual users.

Improving Quality of Service Based on Expected Path and Predicted Activity

When a reduction in network availability is predicted based on the expected path of a mobile device relative to the network availability map, it may be possible to mitigate or eliminate the reduction in quality of service by predicting the activity of the mobile device during the period of reduced network availability.

The actions to mitigate the reduced network availability can vary depending on the predicted activity of a user. For example, one action can be to download in advance content items that correspond to the predicted activity of a user. Content corresponding to predicted activity can be determined as described above. Thus, downloading content in advance could correspond to downloading in advance the next few songs from the playlist of an Internet radio station or downloading the next several minutes of a video ahead of time. Alternatively, this could correspond to downloading content items that are related to the current content accessed by a user. The content items can be related either by similarity of subject matter, or by determining that users who view a certain content item typically view other items. For this option, the content items can be downloaded in advance to a cache on the mobile device. The content items can then be accessed from the cache during the period of reduced network availability.

Another option for mitigating reduced network availability can be to reduce the quality of content being streamed to a device. This may result, for example, in video content being displayed with lower resolution. However, this can be preferable to having an interruption in display of content. In this type of embodiment, the degradation of the content being streamed to a device can be handled by an instruction server. The instruction server could request the content provider to switch to a lower quality feed. Alternatively, the instruction server can receive the feed from the content provider and perform the degradation, such as by performing additional compression on the streaming content.

Still another option for improving quality of service relates to the refresh rate during a period of reduced network availability for content already received by a mobile device. Many types of website content include a validity period or expiration timer for content. During this validity period, the content is considered current by the website and does not need to be refreshed. Other content may not have a tag providing a validity period, but may still be considered current by a website and/or may in fact not need updating. In this situation, quality of service can be improved by managing requests for data refresh by the mobile device. For example, a mobile device can avoid refreshing data until the end of the expiration period for explicitly tagged content.

Alternatively, an instruction server can control the refresh of content data on the mobile device. The instruction server, which is not suffering from the reduced network availability, can instruct the mobile device to wait for content refresh for some or all of the content already stored on the mobile device. The instruction server can then monitor the content provider to determine if the content stored on the device is current. The monitoring of the content provider can occur periodically, or the monitoring can occur in response to a request from the mobile device. This avoids having the mobile device show content is unavailable and/or downloading from a content provider due to a refresh when the content stored on the device is still current. This type of comparison can be made regardless of whether the item has an expiration period, or regardless of whether the item is tagged as being expired based on an expiration period.

Yet another option can be to warn a user that the mobile device is about to enter an area of reduced network availability. For some services, the service will simply not perform properly unless the mobile device is operating within the correct wireless provider network. The user of a mobile device may also be accessing content that cannot be loaded in advance, such as viewing or listening to a live event. In this situation, the mobile device can provide a warning that service is about to be impaired. This can be a general warning, such as a caution that the device is about to leave the service area and/or that the device is about to enter an area of reduced network availability. Alternatively, the warning can be more specific, such as a warning based on the predicted activity of the device. For example, a user that is viewing a live event could be warned that the mobile device is approaching an area with low network availability, and that playback may be impaired.

Communication Interface Agent for Mobile Device

In an embodiment, an application can be provided for a mobile device that serves as an interface between applications that request data from service providers and the communications layer of the mobile device. This application can be referred to as a communication interface agent. The communication interface agent can perform a variety of tasks. One role for the communication interface agent can be to monitor and/or regulate requests by other applications for access to the communications layer. For example, when a web browser on the mobile device makes a request for content from a content provider, the communication interface agent can receive the request. The communication interface agent can then determine how to handle the request. For example, the communication interface agent can determine if the request should be passed to the content provider via the home data gateway for the mobile device. Alternatively, if the content already exists on the mobile device, the communication interface agent can provide the stored content to the application. Still another option is that the communication interface agent can query another entity, such as an instruction server. The communication interface agent can then handle the request based on the instructions from the instruction server. For example, the instruction server may provide instructions to not perform a requested refresh of content due to the fact that a content item already stored on the mobile device is current.

In addition to handling interaction between applications and the communication layer, the communication interface agent can also manage the contents of a cache on the mobile device. The cache provides a storage area for content items. Content items requested by an application that are already in the cache can optionally be provided to the application, as opposed to accessing or acquiring the content items from the content provider. The cache can also hold content that has been acquired in advance, such as content items acquired based on predicted activity. Content can be loaded into the cache based on requests to content providers from the communication interface agent. Alternatively, the instruction server can request content items and then forward the content to the communication interface agent for storage in the cache.

Still another function that can be performed by the communication interface agent is related to the network availability in the current location of the network device. Periodically, the communication interface agent can determine the data transfer rate for the mobile device. This can be done in any convenient manner, and can occur at any convenient interval, such as about once every ten seconds, or about once a minute, or about once every ten minutes. The information regarding network performance can then be forwarded to the instruction server. This can allow the instruction server to construct an availability map. Alternatively, this information could be provided by another component of the wireless network. Optionally, the communication interface agent can also provide location updates to the instruction server, so that an expected path can be determined for a mobile device. Again, this information could be provided by another component of the wireless network.

Home Data Gateway

In various embodiments, the operation of a home data gateway (HDG) can be modified to assist in mitigating reductions in quality of service. In the discussion below, some embodiments may refer to a single HDG. However, it is understood that a plurality of HDGs can be used to distribute the workload of handling multiple mobile devices.

With regard to the traditional function of providing content from content providers, the HDG can operate in a conventional manner. A request can be received from the communication layer of a mobile device. The HDG processes the request and communicates with the corresponding content provider to obtain the requested content. The home data gateway then provides the content to the mobile device.

One modification to an HDG can be to add a content sorting component. In an embodiment, the content sorting component does not modify the operation of the HDG for processing a content request. A content sorting component can sort the content requests received from mobile devices using the HDG. Similarly, the content received from a content provider can also be sorted. The goal of the sorting can be to identify requests and/or content of interest for tracking by an instruction server. A content sorting component can evaluate content requests and content items based on a set of rules. Items of content that match the criteria in the rules can be identified for forwarding to an activity prediction component.

Any requests and/or content of interest to the instruction server can also be forwarded to the instruction server by the HDG. For example, a user may desire to access a financial website to use a retirement savings calculator. This results in a request from the user's mobile device to the HDG for a content page corresponding to the retirement calculator, along with information needed to perform a calculation. This request can be of interest to the instruction server, as the instruction server could use this information to as part of a prediction of other content a user is likely to access after using the retirement calculator. If the request is of interest, the content sorting component of the HDG can forward the request to the instruction server. Optionally, the portion of the request involving the information for the calculation could be removed prior to sending the request to the instruction server. The content provider can then provide the requested content to the HDG. Because this is content involving a specialized calculation, this content may not be of interest to the instruction server. In this situation, the content sorting component would not forward the content returned by the content provider.

In another example, a mobile device can send a request to the HDG for a page of text from a content provider. The content provider can provide the page of text to the HDG, which forwards the content to the mobile device. In this example, the content sorting component can forward both the request and the page of text to the instruction server, as both can be valuable. For example, the request can be used as part of the data for predicting activity. The content itself can be used by the instruction server in order to monitor when the content should be refreshed. This can involve using an expiration timer included with the content, or comparing a posting time for the content with the posting time listed at the content provider.

In still another example, a user of a mobile device can request content from a radio station content provider. The radio station content provider can have a playlist of songs that will be provided to a user. In this situation, the instruction server does not need the individual songs. However, it can be useful to know the current position in the playlist for the mobile device. Thus, the content sorting component can alert the instruction server each time another song is downloaded to the mobile device from the playlist.

More generally, it is understood that the content sorting component provides information to the instruction server. Rather than providing all items that pass through the HDG, the content sorting component provides the instruction server with the items that are used in one or more of the functions performed by the instruction server. This can be determined based on one or more rules that are provided to the content sorting component.

Instruction Server

In various embodiments, one or more instruction servers can be used to mitigate reductions in quality of service. In the discussion below, reference will be made to having an instruction server. However, it is understood that a plurality of servers can be used that are in communication with each other. This is similar to the situation for many types of wireless infrastructure, where multiple stations of a similar type are used. The multiple instruction servers can divide effort in any convenient manner. For example, the instruction servers can be assigned to geographic regions in order to distribute the workload between the servers. As a mobile device moves between regions, the instruction servers can communicate so that the instruction server for the new region is aware of the status of the mobile device. This can include being aware of the contents of the cache of the mobile device, being aware of an expected path for the device, or any other information useful to the invention described herein.

An instruction server can represent a server performing a variety of tasks, or several processors each performing one or more tasks. It is noted that some or all of the components in an instruction server could be included as part of a home data gateway. One component of an instruction server can be a device tracking component. The device tracking component can determine an expected path for a mobile device. Optionally, the device tracking component can also monitor the contents stored in a cache on the mobile device, or this monitoring can be handled by a separate component.

Another component of an instruction server can be a network availability component. This component can construct a map indicating the availability of the network. This can include both the expected properties of the network and the current network capabilities.

Still another component of an instruction server can be an activity prediction component. As described above, future activity by a mobile device can be predicted, possibly based on a variety of factors.

Yet another component of an instruction server can be a content acquisition component. At various time, an instruction server may acquire content from a content provider. The content can be acquired directly from the content provider, or the instruction server could forward the request through a home data gateway. In some embodiments, the content requested by the instruction server may be content that is for an authenticated user. In such an embodiment, the instruction server can "spoof" the identity of the authenticated user in order to gain access to the content. The content acquisition component can be used for content that is requested in advance from a content provider based on a prediction of future activity. This content can then be passed to the mobile device and stored in the cache for the mobile device.

Still another component can be a quality of service mitigation component. The mitigation component provides instructions to a mobile device regarding actions to take when it is determined that the device may encounter a reduced quality of service. These instructions can include obtaining and/or storing content related to predicted future activity, controlling the refresh of content already stored on the device, warning a user of an upcoming change in quality of service, or other actions.

User Experience Example

One example of a user experience can start with a hypothetical user riding a light rail or subway train. As the user is riding, the user is sending and receiving messages via a messaging service that is only available within the network of the primary service provider. In between sending messages, the user is accessing various articles from a subscription news service content provider. The articles are related to business news and politics. Based on the rail path and the average speed of the train, the mobile device receives a notification from an instruction server that the primary service provider network will be unavailable in about 2 minutes. This will be due to the train entering a tunnel or underground region where another service provider has the only available network.

The user is provided with a warning that the device is approaching an area without coverage for the messaging service. The instruction server also provides content items to the mobile device and instructs the mobile device to store the content in cache. The content items include all other current articles from the subscription service related to business and politics that have not been viewed by the user. After entering the tunnel, the user continues to read articles from the subscription content provider. However, one of the articles selected is a travel article that was not identified in the prediction of future activity. The device uses the available alternative wireless network to retrieve this article, while serving the remaining articles from the stored cache. While in the tunnel, the user also requests two stored articles with an expiration timer that has expired. The mobile device uses the alternative wireless network to query the instruction server. For the first article, the instruction server compares the version of the article stored in the mobile device cache with the current version at the content provider, such as by comparing the timestamp for posting of the article. Because the first article is still current, the instruction server instructs the mobile device to use the stored version. For the second article, the instruction server determines that a new version is available, but that the expected path shows the user will re-enter the primary provider service area in a few seconds. The instruction server instructs the device to wait until the primary provider service area is entered to deliver the second article.

After re-entering the primary provider service area, the user exits the train and starts walking toward the user's office. At this point, the user realizes that a web video conference is about to start, and joins using the mobile device. As the user moves, the new expected path shows that the user is going to enter a network area with reduced data flow rates due to large numbers of data requests by other users. The instruction server requests the web conference feed from the content provider and reduces the feed quality, such as be increasing data compression. The user is also warned about the change in service quality. However, this change allows the user to maintain access to the web conference with little or no interruption.

Additional Embodiments

Embodiments of the present invention may be embodied as, among other things: a method, system, or set of instructions embodied on one or more computer-readable media. Computer-readable media can include both volatile and nonvolatile media, removable and nonremovable media, and contemplates media readable by a database, a switch, and various other network devices. By way of example, and not limitation, computer-readable media can comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. In an embodiment, computer readable media can be tangible computer readable media. In another embodiment, computer readable media can be non-transitory computer readable media.

Turning now to FIG. 1, a block diagram of an illustrative mobile computing device ("mobile device") is provided and referenced generally by the numeral 100. FIG. 1 is an example of a mobile device that could be used in accordance with the invention. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 110.

Figure 2:
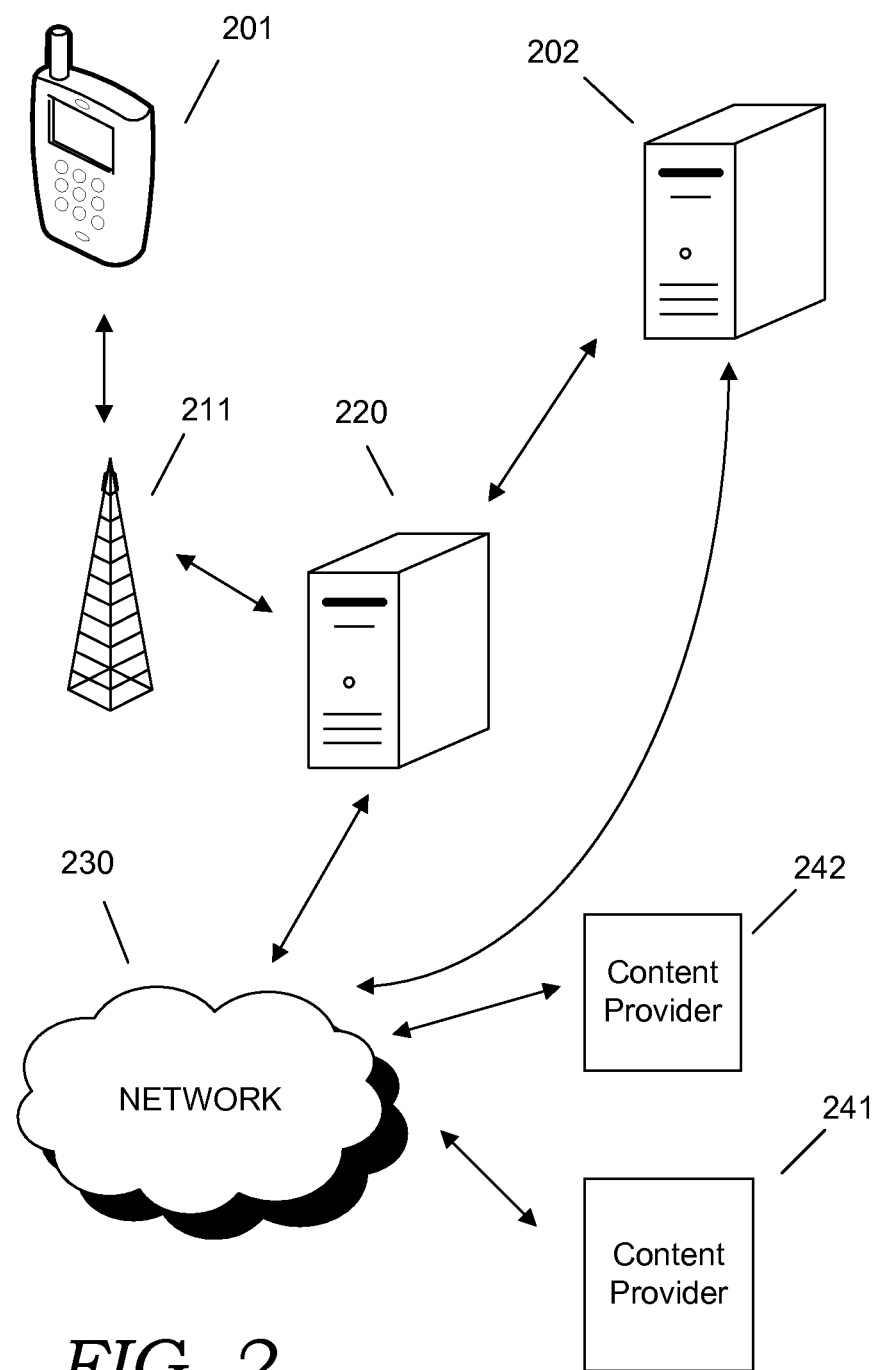
FIG. 2 schematically shows a system suitable for performing an embodiment of the invention.

FIG. 2 shows an example of various components that can operate together according to an embodiment of the invention. In FIG. 2, a mobile device 201 can access a wireless network 211 to communicate with a home data gateway 220. The home data gateway 220 can provide access to content providers 241 and 242 via a network 230, such as a wide area network or any other convenient network. The home data gateway can also interact with an instruction server 202. Instruction server 202 can also optionally access network 230 directly, without passing through home data gateway 220, to access content providers 241 and 242.

FIG. 3 shows an example of components that can be included as part of an instruction server. In the embodiment shown in FIG. 3, the instruction server includes a remote cache monitoring component 310. The remote cache monitoring component 310 can track the information stored in the cache of a mobile device. Device tracking component 320 receives information about the location of a mobile device and can determine an expected path for the device. This could include using a planned GPS route the device has requested, or it could involve calculating an expected path and/or velocity based on recent location data.

Activity prediction component 340 uses information regarding current and/or past usage by mobile devices to predict the likely future activity on a device. Activity prediction can be relatively straightforward, such as predicting that a user will continue accessing a stream of data such as a movie or a radio station. Alternatively, correlations can be developed between types of content to predict a user's future activity based on current and/or past activity. Content sorting component 380 can be used to sort content that passes through a home data gateway. Content of interest for activity prediction can be forwarded to activity prediction component 340. Optionally, content sorting component 380 can be a part of a home data gateway. Content acquisition component 350 can obtain content from content providers. This content can be provided to mobile devices for storage in cache while in a high quality of service area, thus avoiding the need to access the network at a later time when quality of service has been reduced.

Network availability monitoring component 330 collects information regarding the current network service capabilities, such as data transfer rates, for mobile devices within a given geographic area. This information can be used to determine when quality of service will be reduced relative to the maximum capabilities of a network. The network availability information can be maintained in any convenient format, and can be referred to as a network availability table or a network availability map. Quality of service prediction component 360 can compare an expected path developed in device tracking component 320 with a network availability map developed by network availability monitoring component 330. This comparison can allow prediction component 360 to determine whether a mobile device will encounter a reduced quality of service in the near future. Alternatively, quality of service prediction component 360 can also be used to determine when a higher quality of service will resume. The near future can be in about 10 seconds or less, or in about 30 seconds or less, or in about 60 seconds or less, or in about 120 seconds or less, or in about 300 seconds or less. Based on such a prediction, quality of service mitigation component 370 can perform actions and provide instructions to mitigate the reduction in quality of service. For example, a mobile device can be instructed to limit data refresh requests for stored content (as tracked by remote cache monitoring component 310) unless instructed to refresh by the instruction server. Content corresponding to predicted activity can also be acquired in advance by content acquisition component 350 and forwarded to the mobile device for storage.

Figure 4:
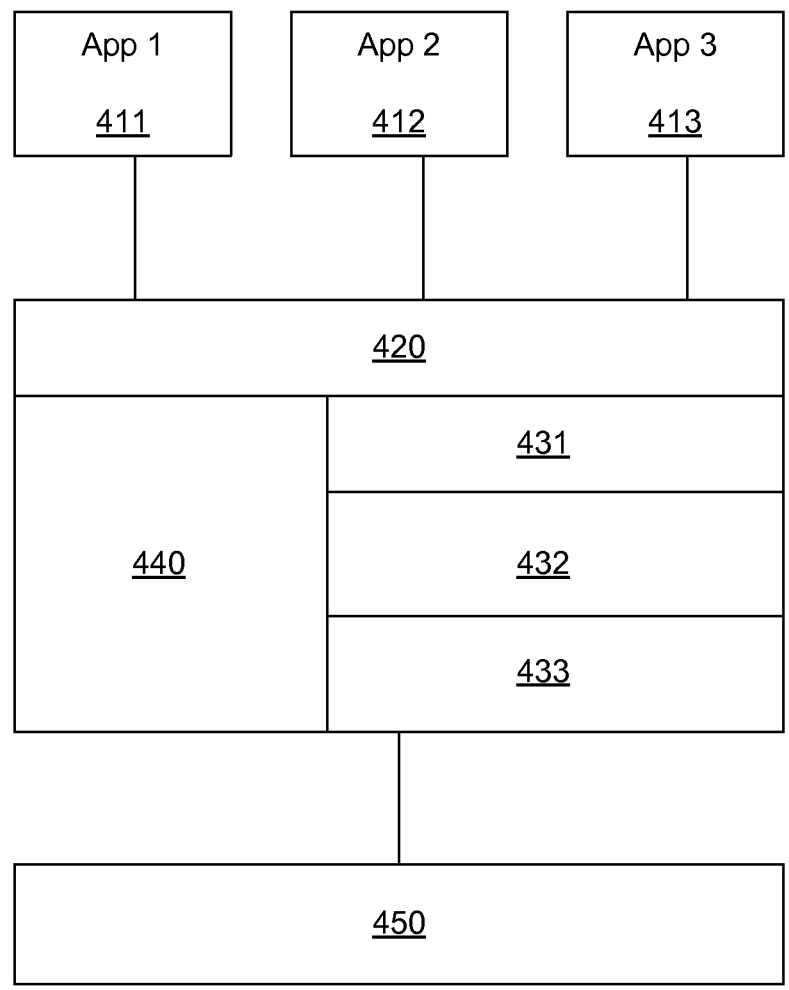
FIG. 4 schematically shows components for a system suitable for performing an embodiment of the invention.

FIG. 4 schematically shows an example of a portion of a mobile device modified according to an embodiment of the invention. In FIG. 4, a mobile device can include multiple applications, such as applications App 1, App 2, and App 3 shown at 411, 412, and 413 respectively. Conventionally, applications 411-413 could communicate directly with data communications layer 450. In the embodiment shown in FIG. 4, however, applications 411-413 communicate with communication interface application 420. Communication interface application 420 receives requests from applications 411-413, and decides whether to forward the requests to data communication layer 450. A request can be forwarded to the data communication layer 450 by a corresponding application specific agent 431-433. If the request is not forwarded, communication interface application 420 can instead provide the requested content from content cache 440.

Figure 5:
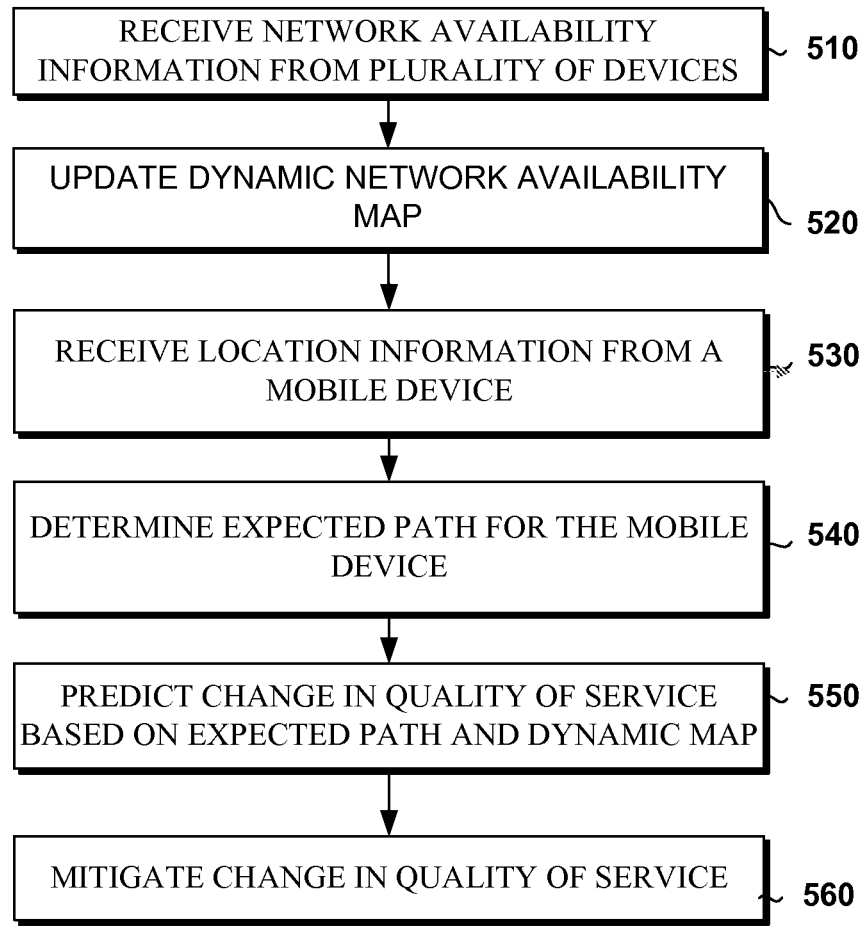
FIG. 5 shows a sample method for improving communication between a mobile device and a network according to an embodiment of the invention.

FIG. 5 provides a flow diagram of a method according to an embodiment of the invention. In FIG. 5, network availability information is received 510 from a plurality of devices. The received information can be used to update 520 a dynamic network availability map. Location information can also be received 530 for a mobile device. Based on the location information, an expected path for the mobile device can be determined 540. The expected path and the dynamic network availability map can be used to predict 550 a change in quality of service for the mobile device. This change in service can then be mitigated 560.

Figure 6:
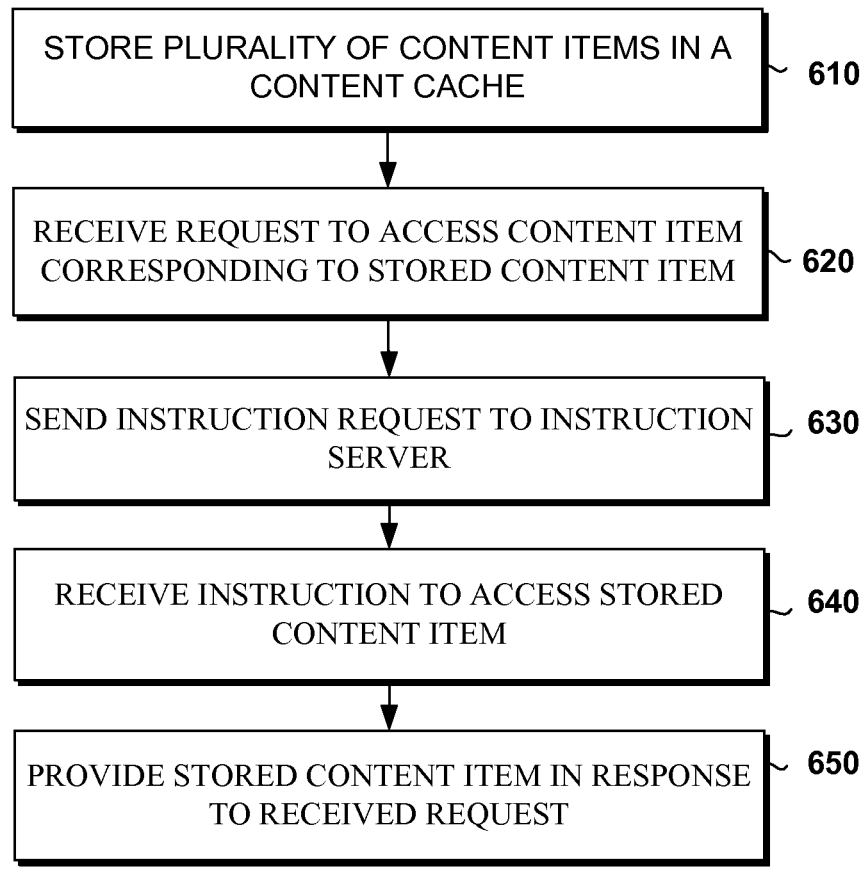
FIG. 6 shows a sample method for improving communication between a mobile device and a network according to an embodiment of the invention.

FIG. 6 provides a flow diagram of another method according to an embodiment of the invention. In FIG. 6, a plurality of content items are stored 610 in a content cache. A request is then received 620 to access a content item that corresponds to one of the plurality of stored content items. An instruction request is sent 630 to an instruction server. An instruction is received 640 to access the stored content item. The stored content item is provided 650 in response to the received request.

In yet another embodiment, a system is provided for providing content to a mobile device. The system includes a data gateway. The system also includes a content sorting component capable of sorting content and content requests that are processed by the data gateway. The system further includes an activity prediction component capable of predicting activity based at least in part on sorted content. The system also includes a mobile device tracking component. The system further includes a network availability monitoring component. The system also includes a quality of service predictor capable of providing predictions based on device tracking information and network availability information. The system also includes a quality of service mitigation component capable of providing instructions to a mobile device based on a quality of service prediction and an activity prediction.

In still another embodiment, one or more computer-readable media having computer-executable instructions embodied thereon that, when executed, perform a of method of managing communication between a mobile device and a content provider are provided. The method includes receiving network availability information from a plurality of mobile devices. A dynamic network availability map is updated based on the received network availability information. Location information is received from a mobile device, the mobile device being within a service area of a wireless network. An expected path for the mobile device is determined based on the received location information. A change in quality of service for the mobile device is predicted based on the expected path and the dynamic network availability map. The change in quality of service is then mitigated for the mobile device.

In still another embodiment, a method for improving quality of service for a mobile device is provided. The method includes storing a plurality of content items in a content cache. A request is received to access a content item corresponding to one of the plurality of stored content items. An instruction request is sent to an instruction server. An instruction is received to access the stored content item. The stored content item is provided in response to the received request.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method of accessing stored content on mobile devices, the method comprising:
   using a first network, storing a plurality of content items in a content cache;
   receiving a request to access a content item corresponding to one of the plurality of stored content items;
   using a second network, sending an instruction request to an instruction server within the second network that compares a stored version of the requested content item in the content cache with a current version of the requested content item at a content provider;
   using the second network, receiving an instruction from the instruction server to access the stored version of the requested content item or access the current version of the requested content item from the content provider; and
   providing the requested content item in response to the received request.

2. The computer-readable media of claim 1, wherein the stored version of the requested content item has an expiration time such that the instruction request to the instruction server is sent after the expiration time.

3. The computer-readable media of claim 1, wherein the method further comprises:
  using the second network, receiving an instruction that the stored version of the requested content item is the same as the current version of the requested content item; and
  receiving an instruction to access the stored version of the requested content item from the content cache.

4. The computer-readable media of claim 1, wherein the method further comprises:
  using the second network, receiving an instruction that the stored version of the requested content item is not the same as the current version of the requested content item; and
  receiving an instruction to access the current version of the requested content item from the content provider.

5. The computer-readable media of claim 1, wherein the method further comprises:
  receiving a request to access at least one content item from the content provider that is not stored in the content cache; and
  providing the at least one content item from the content provider.

6. The computer-readable media of claim 1, wherein the method further comprises:
  receiving a plurality of content items from the instruction server, the plurality of content items corresponding to content from the content provider, wherein the plurality of content items are stored in the content cache.

7. The computer-readable media of claim 6, wherein the method further comprises:
  receiving a request to access an additional content item from the content provider; and
  receiving an instruction from the instruction server to delay access to the additional content item.

8. The computer-readable media of claim 7, wherein the method further comprises:
  detecting a change in quality of service of a mobile device;
  sending a request for the additional content item to the content provider; and
  providing the additional content item.

9. The computer-readable media of claim 8, wherein the additional content item is a content item from the plurality of content items from the instruction server, the additional content item having an expiration time.

10. The computer-readable media of claim 9, wherein the additional content item is provided before the expiration time.

11. The computer-readable media of claim 1, wherein the method further comprises receiving an instruction from the instruction server to wait for a mobile device to enter a primary provider service area before providing the requested content item.

12. A system for improving quality of service for mobile devices, the system comprising:
  a content provider;
  a mobile device having a content cache for storing a plurality of content items; and
  an instruction server operating within a wireless infrastructure, wherein the instruction server is configured to:
    (1) receive an instruction request from the mobile device,
    (2) compare a stored version of a requested content item in the content cache with a current version of the requested content item at the content provider, and
    (3) provide an instruction to the mobile device to access the stored version of the requested content item in the content cache or retrieve the current version of the requested content item from the content provider.

13. The system of claim 12, wherein the instruction server is further configured to:
  receive a request to access at least one content item from the content provider that is not stored in the content cache; and
  provide the at least one content item from the content provider.

14. The system of claim 12, wherein the instruction server is further configured to determine that the stored version of the requested content item is or is not the same as the current version of the requested content item at the content provider.

15. The system of claim 12, wherein the instruction server is further configured to:
  detect a change in quality of service provided to the mobile device;
  send a request for an additional content item to the content provider; and
  provide the additional content item to the mobile device.

16. The system of claim 12, wherein the mobile device is configured to receive the plurality of content items over a first network and communicate with the instruction server and the content provider over a second network.

17. A method for improving quality of service for a mobile device, the method comprising:
  using a first network, storing a plurality of content items in a content cache;
  receiving a request to access a content item corresponding to one of the plurality of stored content items;
  using a second network, sending an instruction request to an instruction server within the second network;
  using the second network, receiving an instruction to access a content item in the content cache or access the content item in a content provider; and
  providing the content item in response to the received request.

18. The method of claim 17, further comprising using the second network, receiving an instruction to access the content item in the content cache, wherein the content item in the content cache has an expiration time such that the instruction request to the instruction server is sent before the expiration time.

19. The method of claim 17, further comprising:
  receiving a request to access at least one content item from the content provider;
  providing the at least one content item from the content provider;
  receiving a plurality of content items from the instruction server that correspond to content from the content provider,
  wherein the plurality of content items stored in the content cache include the plurality of content items received from the instruction server.

20. The method of claim 19, further comprising:
  receiving a request to access an additional content item from the content provider;
  detecting a change in quality of service;
  sending a request for the additional content item to the content provider;
  receiving an instruction to delay access to the additional content item; and
  providing the additional content item.

21. The method of claim 20, wherein the additional content item is a content item from the plurality of content items from the instruction server, the additional content item having an expiration time, the additional content item being provided after the expiration time.

22. The method of claim 20, wherein the additional content item is not included in the plurality of content items stored in the content cache.

* * * * *